2,886,427
PELLETIZING CALCIUM TUNGSTATE

Carl A. Martin, Edgewood, Md., and Paul B. Sweet, Denver, Colo.

No Drawing. Application March 8, 1955
Serial No. 493,058

5 Claims. (Cl. 75—3)

This invention relates to the pelletizing of calcium tungstate to prepare the same for handling and storage.

Calcium tungstate, or synthetic scheelite as it is sometimes called, has some direct uses in industry, but its main importance at the present time is that it is a convenient form in which to stockpile tungsten before refining it to obtain the pure metal. The handling and storage of calcium tungstate, however, presents a problem because of its powdery nature, and the handling and storage of calcium tungstate in powdered form is quite unsatisfactory. Therefore, the practice has grown up of mixing calcium tungstate with a binder or diluent, and then forming the mixture into pellets. This procedure has the disadvantage of diluting the tungsten concentration in the pellets. Further, it makes the calcium tungstate unsuitable for a number of direct uses for this compound. Therefore, there has been a definite need for providing a better method of forming calcium tungstate into pellets.

It is therefore a general object of this invention to provide an improved method of pelletizing calcium tungstate, and it is also an object to provide calcium tungstate pellets having relatively higher concentrations of tungsten therein, and which do not contain a diluent or binder material other than a tungsten compound. Further objects and advantages will appear as the specification proceeds.

In the recovery of tungsten by the alkali fusion process, a solution of sodium tungstate is obtained. The tungsten is removed from this solution by precipitation with calcium chloride, which forms a precipitate of calcium tungstate. The calcium tungstate thus obtained will be finely divided, and it is this material which has heretofore been formed into pellets by the addition of a binder. However, the calcium tungstate frequently contains impurities, the principal impurity being calcium carbonate, which in some cases may be present in concentrations of as much as 15% by weight. Phosphates, such as tricalcium phosphate, may also be present in small amounts. It is therefore of considerable importance that the method of this invention in one preferred embodiment provides a means for eliminating such impurities while at the same time placing the calcium tungstate in a condition permitting it to be directly pelletized without the addition of any diluting binder material.

According to this invention, the calcium tungstate precipitate is washed with an aqueous solution of an acid forming water-soluble calcium salts until the calcium tungstate contains from .5 to 10% by weight of tungstic acid. The mixture is then dried, and compressed into pellets. The washing step wherein the tungstic acid is formed, also serves to remove the calcium salt impurities like calcium carbonate and tricalcium phosphate, since an acid forming water-soluble calcium salts is used. While various acids of this type are suitable, best results are obtained with hydrochloric acid or nitric acid in 1 to 10% aqueous solutions thereof. Unusually good results have been obtained with a 1 to 10% aqueous solution of hydrochloric acid, while washing the impure calcium tungstate until from .5 to 5% by weight of tungstic acid is formed. During this washing step, substantially all of the calcium carbonate and tricalcium phosphate will also be removed, thus purifying and at the same time preparing the calcium tungstate for pelletizing.

This invention is further illustrated by the following specific examples.

Example I 10 lbs. of "raw" artificial scheelite was washed with a dilute (1 pt. HCl to 7 pts. water). The raw scheelite (calcium tungstate) assayed 51.5% on a $WO_3$ basis, 12% $CaCO_3$ and .165 phosphate. Following one hour residence in the acid solution the treated product was dried and assayed. The $WO_3$ content was 71.5%, lime as $CaCO_3$ nil, and phosphate .003%. The product contained about 5% tungstic acid, and on drying at 110° C. and calcining formed hard firm pellets upon compression.

Example II

Following the same procedure described in Example I, other batches of artificial scheelite were processed into pellets. These batches analyzed 56–60% on a $WO_3$ basis, 6–8% $CaCO_3$, and varying amounts of phosphate under .2%. It was found that the optimum residence time in the aqueous HCl wash was about 30 minutes.

Example III

Purified calcium tungstate can be pelletized by the following procedure: Take 100 parts of calcium tungstate and mix thoroughly with 10 parts of tungstic acid. Then compress the mixture into pellets.

While in the foregoing specification this invention has been described in relation to preferred embodiments thereof and certain details have been set forth for purpose of illustration, it will be apparent to those skilled in the art that this invention is susceptible to other embodiments and that many of the details set forth herein can be varied widely without departing from the basic concepts of the invention.

We claim:

1. The method of washing and pelletizing calcium tungstate, comprising washing finely-divided calcium tungstate with an aqueous solution of an acid forming water-soluble calcium salts until said calcium tungstate contains from .5 to 10% by weight of tungstic acid, drying the resulting mixture of calcium tungstate and tungstic acid, and then compressing said mixture into pellets.

2. The method of claim 1 in which said aqueous solution consists of a 1 to 10% aqueous solution of an acid selected from the group consisting of hydrochloric and nitric acids.

3. The method of purifying and pelletizing calcium tungstate, comprising washing finely-divided calcium tungstate with a 1 to 10% aqueous solution of hydrochloric acid until said calcium tungstate contains from .5 to 5% by weight of tungstic acid, drying the resulting mixture of calcium tungstate and tungstic acid, and then compressing the dried mixture into pellets.

4. The method of processing impure calcium tungstate containing calcium carbonate as an impurity thereof, comprising washing said impure calcium tungstate with a 1 to 10% aqueous solution of an acid selected from the group consisting of hydrochloric and nitric acid to remove the calcium carbonate and to convert a portion of the calcium tungstate to tungstic acid, said washing step being continued until substantially all of said calcium carbonate is removed and until from .5 to 10% by weight of tungstic acid is formed, drying the resulting mixture of purified calcium tungstate and tungstic acid, and then compressing said mixture into pellets.

5. The method of processing impure calcium tungstate containing calcium carbonate as an impurity thereof, comprising washing said impure calcium tungstate with a 1 to 10% aqueous solution of hydrochloric acid to remove the calcium carbonate and simultaneously to convert a portion of the calcium tungstate to tungstic acid, continuing said washing until said calcium tungstate contains from .5 to 5% by weight of tungstic acid, drying the resulting mixture of purified calcium tungstate and tungstic acid, and then compressing said mixture into pellets.

References Cited in the file of this patent

UNITED STATES PATENTS

| | | |
|---|---|---|
| 2,363,575 | De Lamatter et al. | Nov. 28, 1944 |
| 2,541,109 | Shabaker | Feb. 13, 1951 |
| 2,641,044 | Bearer | June 9, 1953 |

FOREIGN PATENTS

| | | |
|---|---|---|
| 7,460 | France | June 4, 1907 |
| 22,057 | Great Britain | Nov. 5, 1915 |